US008694363B2

(12) United States Patent
Olliphant et al.

(10) Patent No.: US 8,694,363 B2
(45) Date of Patent: Apr. 8, 2014

(54) DYNAMICALLY CREATING A CONTEXT BASED ADVERTISEMENT

(75) Inventors: Hugo Olliphant, San Francisco, CA (US); George Lee, Mountain View, CA (US)

(73) Assignee: eBay Inc., San Jose, CA (US)

( * ) Notice: Subject to any disclaimer, the term of this patent is extended or adjusted under 35 U.S.C. 154(b) by 1760 days.

(21) Appl. No.: 11/765,656

(22) Filed: Jun. 20, 2007

(65) Prior Publication Data

US 2008/0319839 A1    Dec. 25, 2008

(51) Int. Cl.
*G06Q 30/00*    (2012.01)
(52) U.S. Cl.
USPC ........................................... 705/14.1
(58) Field of Classification Search
USPC ........................................... 705/14.1
See application file for complete search history.

(56) References Cited

U.S. PATENT DOCUMENTS

| 6,327,574 | B1 | 12/2001 | Kramer et al. | |
|---|---|---|---|---|
| 2008/0098300 | A1* | 4/2008 | Corrales et al. | 715/243 |
| 2008/0201220 | A1* | 8/2008 | Broder et al. | 705/14 |

FOREIGN PATENT DOCUMENTS

WO    WO-2008156684 A1    12/2008

OTHER PUBLICATIONS

"Application Serial No. PCT/US2008/07421, International Search Report and Written Opinion mailed Sep. 16, 2008", p. 220.

* cited by examiner

*Primary Examiner* — Daniel Lastra
(74) *Attorney, Agent, or Firm* — Schwegman, Lundberg & Woessner, P.A.

(57) ABSTRACT

A method and a system dynamically generates an advertisement based on one or more tokens distilled from information about a web session that requested a web page. For example, a token is distilled from information about a web session. Data is retrieved from a commerce database based on the token. The retrieved data is assembled into an advertisement, which is then supplied for rendering with the web page.

22 Claims, 10 Drawing Sheets

DYNAMICALLY CREATING A CONTEXT BASED ADVERTISEMENT

TECHNICAL FIELD

The present application relates generally to the technical field of data processing and networks and, in one specific example, to processing data to dynamically generate an advertisement for rendering with a web page.

BACKGROUND

Conventional online advertising is limited to statically generated advertisements. Static advertisements began with text, images, and hyperlinks. These types of static advertisements are still utilized, but static advertisements now also utilize audio, video, and scripts to enhance advertisements. Despite these enhancements, the advertisements are still static. The advertisement does not adapt to changes in web page content, product offerings, prices, etc. If a change occurs, a new advertisement is created manually.

In addition, conventional advertisements do not facilitate comparative shopping. For instance, the advertisements displayed on a web page with search results typically provide limited information about a particular merchant and do not provide information to allow a purchaser to compare products without visiting other web pages.

BRIEF DESCRIPTION OF THE DRAWINGS

Some embodiments are illustrated by way of example and not limitation in the figures of the accompanying drawings in which.

DETAILED DESCRIPTION

Figure 1:
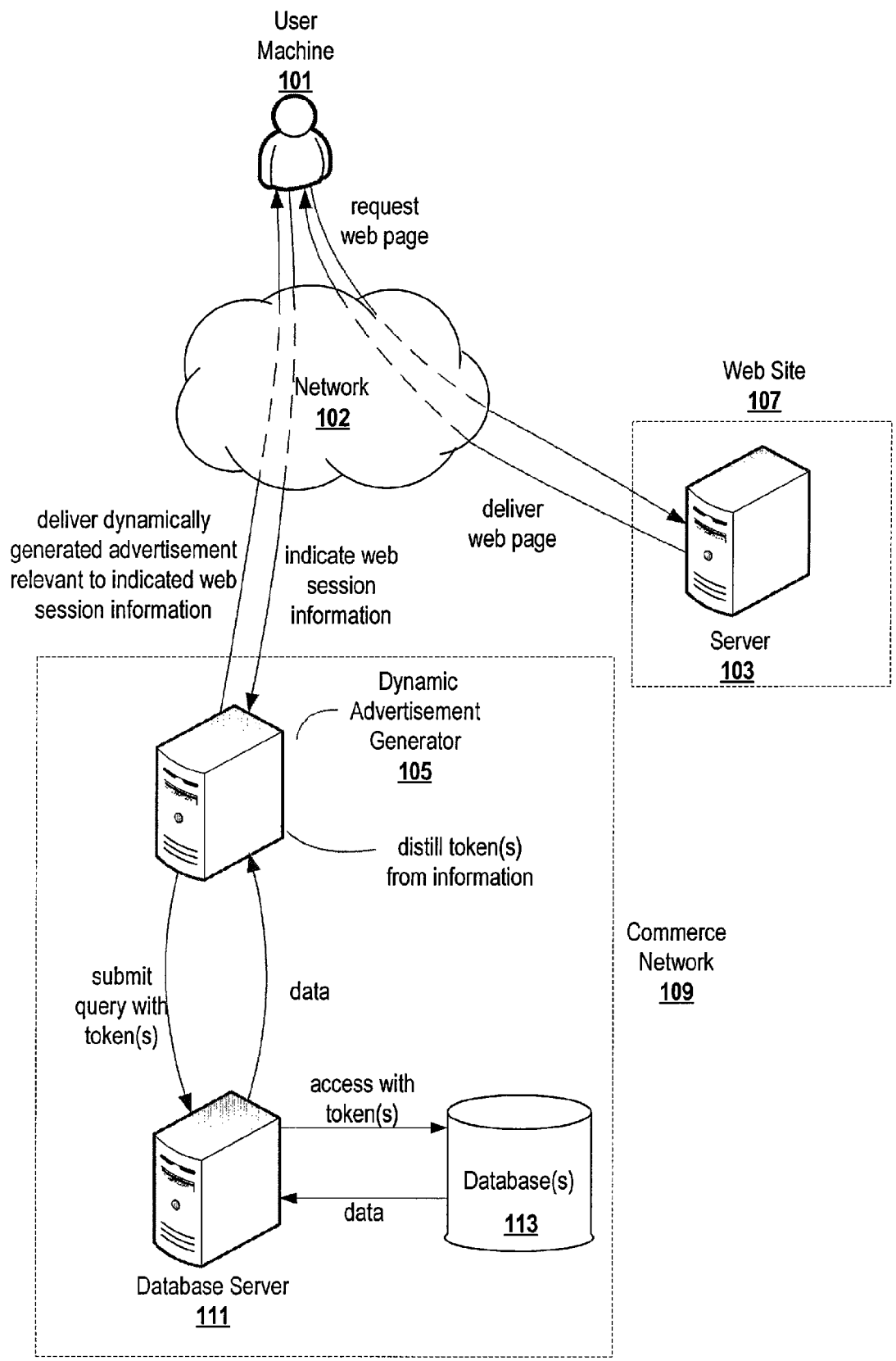
FIG. 1 is a diagram of an example interaction for retrieving a dynamically created advertisement and a web page from a network perspective.

Example methods and systems to dynamically create publication data (e.g., an advertisement) are described. In the following description, for purposes of explanation, numerous specific details are set forth in order to provide a thorough understanding of example embodiments. It will be evident, however, to one skilled in the art that the present invention may be practiced without these specific details.

Commerce networks, such as those controlled by EBAY, Inc., accumulate a vast amount of valuable data to drive shopping. The data includes behavioral data of both buyers and sellers (e.g., products last viewed by a user, products and product categories purchased by a user, etc.), product listings, merchant reputations, product offerings, product performance, product reviews, static advertisements, etc. The value of this data lies in its utility. This utility can be increased if the data is pushed beyond the boundaries of the commerce networks. Although pushed to a limited degree beyond commerce networks through various generic avenues, such as search engines, this data can be pushed out to web pages more relevant to particular data items. In addition, pushing this data to other properties, such as blogs and publisher's web pages, allows a user to view the valuable data without interrupting the web surfing experience of the user. Furthermore, presenting the data relevant to content of a web page being visited by a user complements the user's activities.

To illustrate, assume a user begins browsing online to read reviews about a new video game. The user accesses an online review. In addition to fetching the web page with the review, dynamically created advertisements are supplied from a commerce network based on subject matter of the web page. In this example, the subject matter may include the video game and the consoles compatible with the video game. Hence, the commerce network generates and supplies advertisements for the consoles and the video game. An advertisement for the video game is generated from three different entries for the video game in a product catalog database. For example, price and information about the video game from three different merchants are retrieved and assembled into an advertisement for the video game. For the compatible consoles, user ratings and price information from different merchants for each of the two difference consoles are retrieved and assembled into advertisements that allow a user to comparatively shop without visiting multiple web pages. When the web page review is rendered, text for the video game, an image for a first console, and text for a second console are associated with the respective dynamically created advertisements. Certain effects (e.g., outlining) are applied to the text and the image to distinguish from surrounding content. When the user encounters the text for the video game (e.g., the first time the name of the game occurs), the user is able to cause display of the corresponding dynamically created advertisement. Similarly, when the user encounters the image for the first console and the text for the second console, the user is again able to cause display of the respective dynamically created advertisements.

FIG. 1 is a diagram of an example interaction for retrieving a dynamically created advertisement and a web page at a network perspective. In a web session, a user machine 101 requests a web page from a server 103 at a website 107. The server 103 delivers the web page to the user machine 101 via a network 102 (e.g., a LAN, a WAN, the Internet, etc.). Code or a reference in the web page causes the user machine 101 to request a dynamically created advertisement. In another example, a client running on the user machine 101 causes the user machine 101 to request the dynamically created advertisement. The user machine 101 indicates information about the web session (e.g., user information, web page content, etc.) in which the web page was requested to a dynamic advertisement generator 105 of a commerce network 109.

The dynamic advertisement generator 105 uses the information from the user machine 101 to retrieve data to dynamically generate an advertisement. The dynamic advertisement generator 105 distills a token(s) from the information. A token may be a word, phrase, symbol, etc. The dynamic advertisement generator 105 submits a query with the token(s) to a database server(s) 111. The database server 111 accesses a database(s) 113 with the token and receives data as a result(s). The database server 111 passes the data back to the dynamic advertisement generator 105. The data may be product specific (e.g., an iPOD NANO® device, an XBOX game console, etc.), general to a product category (e.g., green building materials), specific to a merchant (e.g., Eco_Jewelry, LLC), etc. The dynamic advertisement generator 105 assembles the data into an advertisement. For instance, the dynamic advertisement generator 105 compiles a dynamic HTML page. The dynamic advertisement generator 105 delivers the dynamically created advertisement, which is relevant to the indicated web session information, to the user machine 101 via the network 102.

When the web page is accessed, operations to begin generation of a dynamically created advertisement are initiated. Various techniques can be employed to trigger the dynamic generation of an advertisement. Code can be embedded in a web page, code can reside at a user machine, etc. A publisher (e.g., blog writer/content owner), commerce network controller, or merchant can place code in a web page using a script, inline frames, other HTML tags, etc. For example, a publisher may add the following HTML tag to their web page: <iframe width=300 height=400 src=http://www.ebay.com/DHTML_ads/?publisherID=12074/>. In another example, a third party may place the trigger in the web page without involving the publisher. When a browser encounters this trigger, the iframe is requested, which will be a dynamically created advertisement. Triggering code that resides at a user machine may be pre-configured with additional or no configuration by the user. The configuration may indicate particular domains to analyze or not to analyze. Those web pages that can be analyzed for information may be forwarded to the commerce network for analysis.

Figure 2:
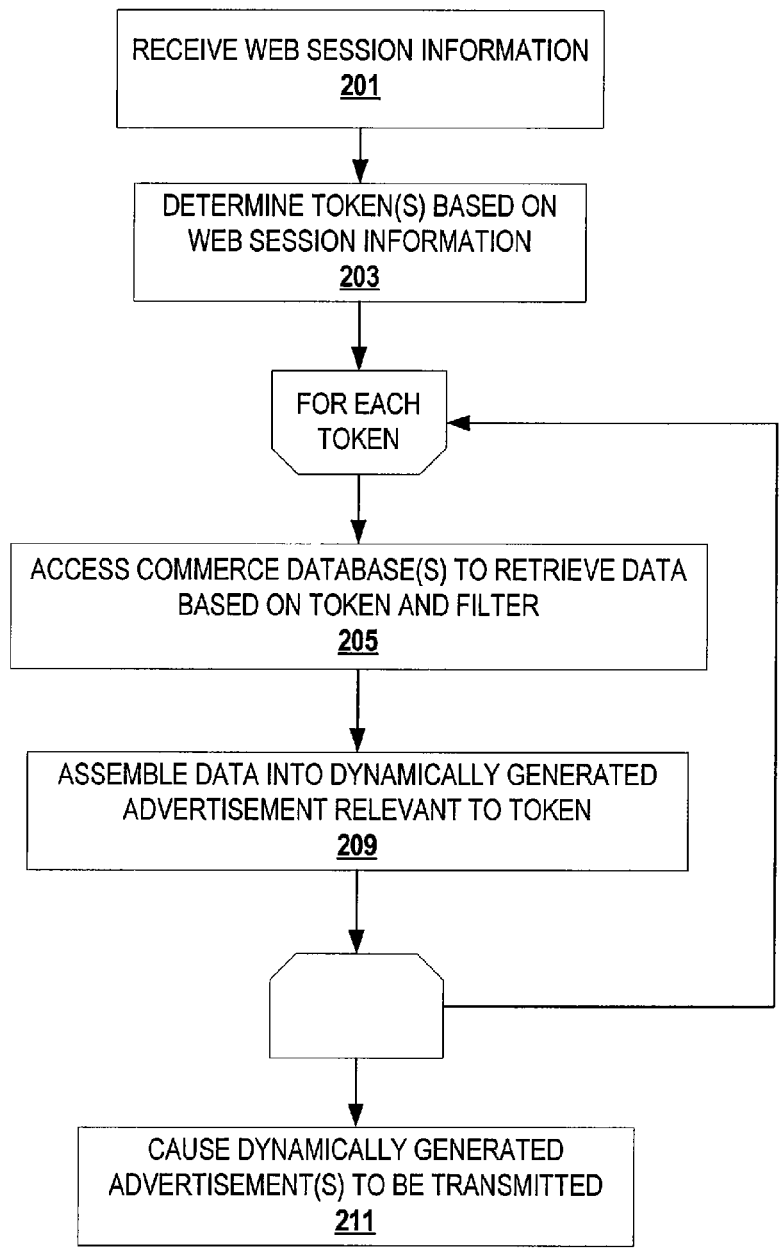
FIG. 2 is a flowchart of example operations for dynamic generation of an advertisement.

FIG. 2 is a flowchart of example operations for dynamic generation of an advertisement. At block 201, web session information is received. At block 203, a token(s) is determined based on the received web session information. For each determined token, the operations at blocks 205 and 209 are performed. At block 205, a commerce database is accessed to retrieve data based on the token, and, perhaps, in accordance with a filter. A filter may be used to reduce the amount of data retrieved. At block 209, the data is assembled into a dynamically created advertisement relevant to the token. If there are no additional tokens, then control flows to block 211. At block 211, the dynamically created advertisement(s) is caused to be transmitted. Of course, the flow of operations may be different than depicted in FIG. 2. For example, each advertisement may be transmitted as generated. In another example, a threshold number of advertisements are queued and then transmitted.

Figure 3:
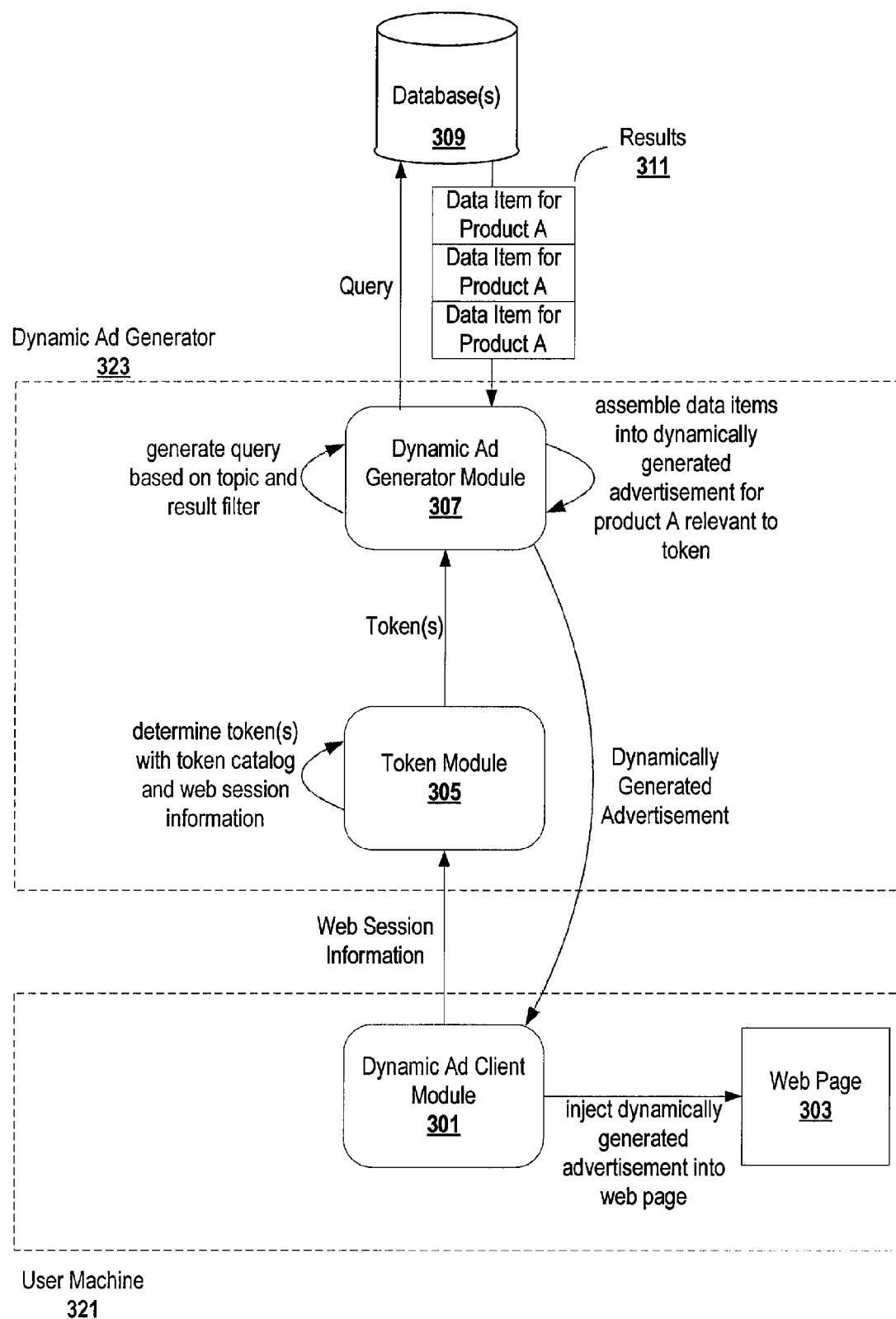
FIG. 3 is a diagram that depicts example modules to implement dynamic generation of advertisements.

FIG. 3 is a diagram that depicts example modules to implement dynamic generation of advertisements. In FIG. 3, a user machine 321 includes a dynamic advertisement client module 301. The user machine 321 has requested and received, either partially or wholly, a web page 303. The dynamic advertisement module 301 may be installed as a plug-in into a browser, script downloaded during rendering of the web page 303, etc. The dynamic advertisement module 301 communicates web session information to a dynamic advertisement generator 323. As stated above, the web session information may be user information (e.g., username, geographic information, network address, etc.), content of the web page, tags from the web page, etc.

The dynamic advertisement generator 323 includes a token module 305 and a dynamic advertisement generator module 307. The token module 305 determines one or more tokens with a token catalog and the communicated web session information. The one or more tokens are then passed to the dynamic advertisement generator module 307. The dynamic advertisement generator module 307 generates a query with the token(s) and possibly a data filter to narrow results. The module 307 submits the query to a database(s) 309. In response, the database 309 returns results 311, which include multiple data items for product A. The module 307 assembles the data items into an advertisement for product A, which is relevant to the token(s) distilled from the web session information by the token module 305. The module 307 then delivers the dynamically created advertisement to the dynamic client module 301 at the user machine 323.

Figure 4:
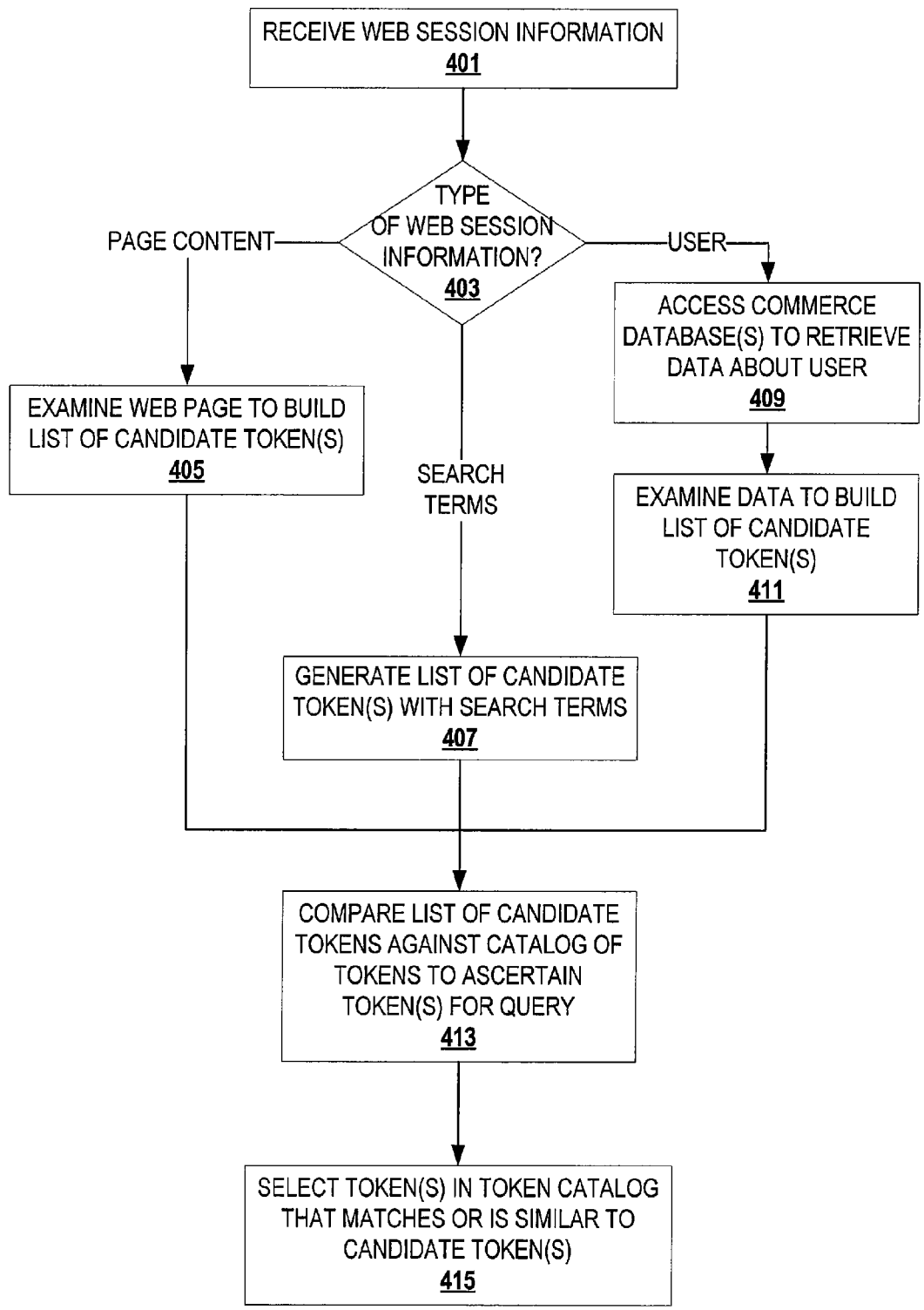
FIG. 4 is a flowchart that depicts example operations for distilling a token from web session information.

FIG. 4 is a flowchart that depicts example operations for distilling a token from web session information. At block 401, web session information is received. At block 403, the type of web session information is determined. If the type is page content, then control flows to block 405. If the type is search terms, then control flows to block 407. If the type is user information, then control flows to block 409.

At block 405, the web page is examined to build a list of candidate tokens. Control flows from block 405 to block 413.

At block 407, a list of candidate tokens is generated with the search terms. Control flows from block 407 to block 413.

At block 409, a commerce database is accessed to retrieve data about the user. At block 411, the data is examined to build a list of candidate tokens. Control flows from block 411 to block 413.

At block 413, the list of candidate tokens is compared against a catalog of tokens to ascertain one or more tokens for use in a query. At block 415, those tokens in the token catalog that match or are similar to the candidate tokens are selected for use in a query.

Figure 5:
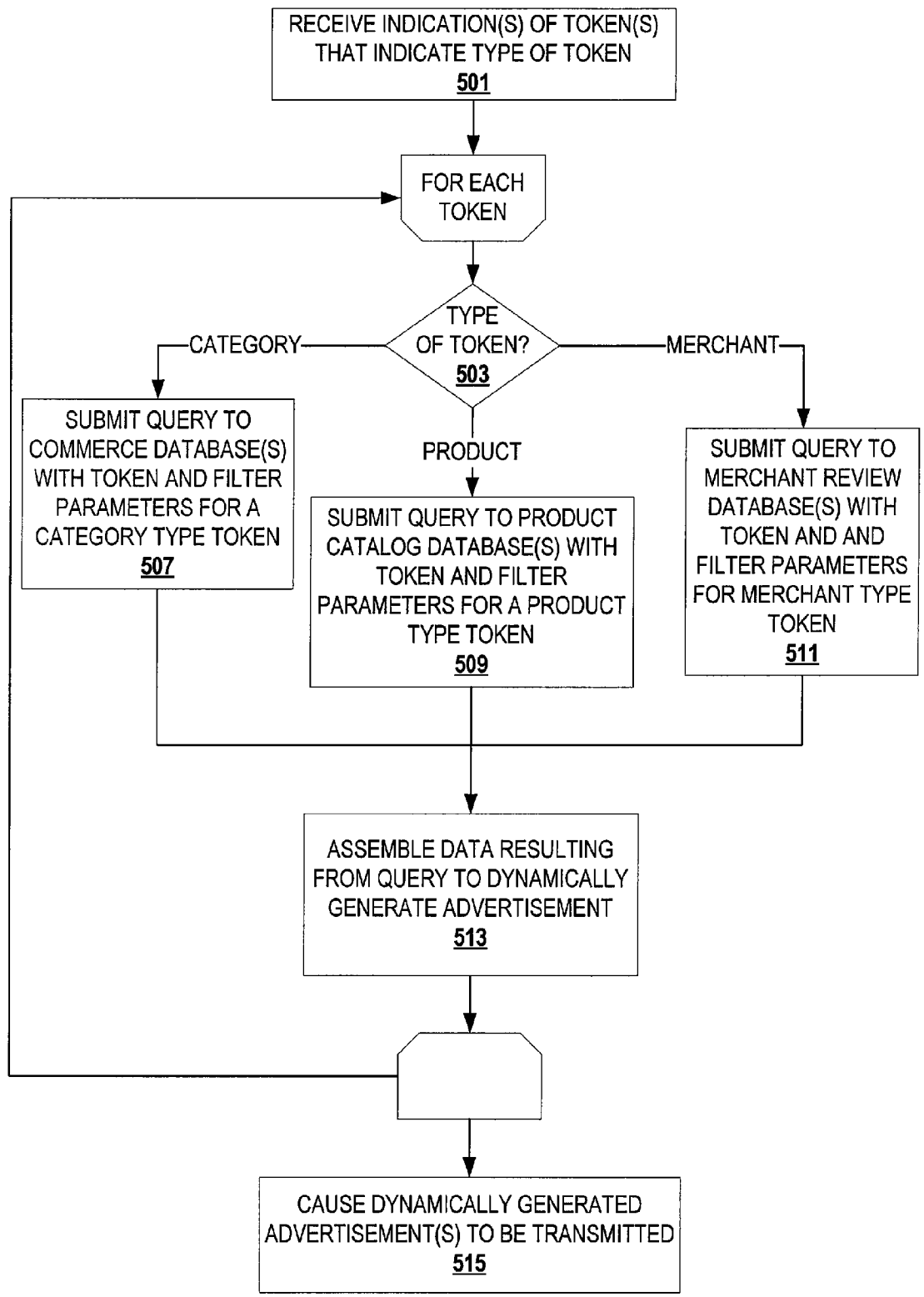
FIG. 5 is flowchart that depicts example operations for generating a query with a selected token.

FIG. 5 is flowchart that depicts example operations for generating a query with a selected token. At block 501, an indication of a token(s) that indicates a type of token is received. After block 501, a control loop begins that iterates for each indicated token. At block 503, the type of token is determined. If the type of token is a category type token, then control flows to block 507. If the type of token is a merchant type token, then control flows to block 511. If the type of token is a product type token, then control flows to block 509.

At block 507, a query is submitted to a commerce database(s) with the token and filter parameters for a category type of token. For example, the token may be specific to a category of products, such as "earrings." The filter parameters may direct the query to retrieve results that include a content site about the history of earrings and how to determine the quality of earrings, 2-3 merchants who specialize in earrings, and a featured product listing for the currently best selling earrings across the commerce network. Control flows from block 507 to block 513.

At block 509, a query is submitted to a product catalog database(s) with the token and filter parameters for a product type token. For example, if the token is "iPod NANO® device," an advertisement may be limited to the most relevant 5 product listings from the product catalog database. To limit the data, the filter parameters may restrict results to the cheapest prices, the fastest shipping, the most trusted merchants, the merchants with the best return policy, etc. Control flows from block 509 to block 513.

At block 511, a query is submitted to a merchant review database(s) with the token and filter parameters for a merchant type token. For example, filter parameters for a merchant type token may restrict results to feedback ratings and customer reviews. Control flows from block 511 to block 513.

At block 513, the data resulting from the query is assembled to dynamically generate an advertisement. If there are no additional tokens, then control flows to block 515. At block 515, the one or more dynamically created advertisements are caused to be transmitted.

Figure 6:
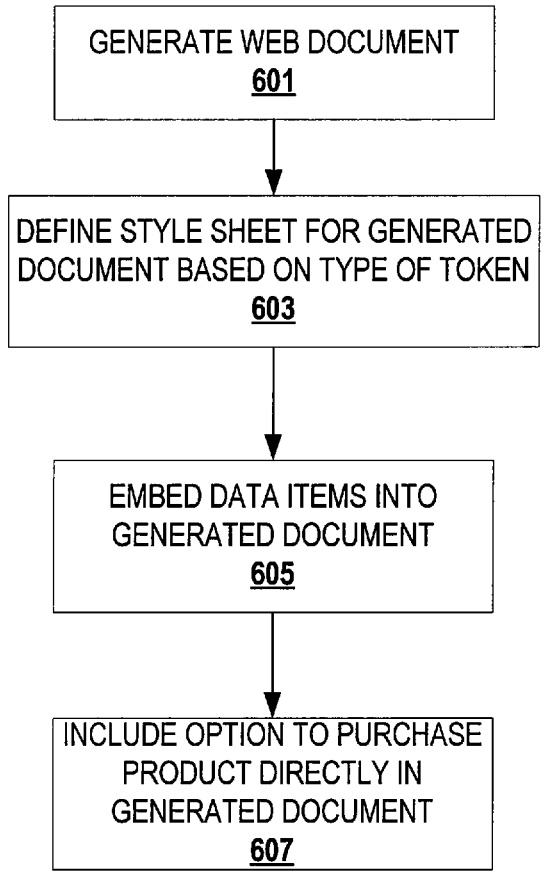
FIG. 6 is a flowchart that depicts example operations for assembling data into an advertisement.

FIG. 6 is a flowchart that depicts example operations for assembling data into an advertisement. At block 601, a web document is generated. At block 603, a style sheet is defined for the generated web document based on the type of token. A first style sheet may be defined for product type tokens while another style sheet is defined for merchant type tokens. At block 605, the data items are embedded in the generated web document. At block 607, an option to purchase a product directly is included in the generated document.

Referring back to FIG. 3, the module 305 injects the dynamically created advertisement received from the module 307 into the web page 303. For example, the following may be injected into an inline frame tag of the web page: "<div id=visible_ad><a href="javascript:showAd(1);">Click here to compare iPod Nanos</a></div>." Upon clicking, the invisible layer containing the rich information for the advertisement is revealed. The invisible layer may be encoded as follows: "<div id=invisible_ad_1 style="display: none;">Here are the top 5 options for purchasing an iPod Nano device. Just click the option you want to make a purchase.</div>." With this option, the user can then directly purchase the product from the advertisement, further reducing interruption in the browsing behavior. Hence, a purchaser is provided a smooth shopping experience because the advertisement provides information to allow comparison of products without leaving the site until the purchaser decides to purchase. Furthermore, the transition from research to purchase is smooth since the single click takes the user directly to the checkout stage. Instead of being directed to a merchant site that lists numerous products, selecting a product, and then checking out, the purchaser is immediately directed to check out for the relevant product.

The direct purchase feature can also be utilized with a dynamically created advertisement without comparative information. An advertisement can be dynamically created for a specific product from a particular merchant. For instance, a blog page may be trusted by a user that frequently visits the blog. The blog page includes a good review of a particular product that recommends the product. So, the dynamically created advertisement for the product is in the context of a positive review by the blogger. Based on this positive review, a user decides to purchase the recommended product without further research. The user can click on a link in the dynamically created advertisement and be taken directly to a checkout site for the product, thus reducing, if not eliminating, interruption of the user's experience.

Platform Architecture

Figure 7:
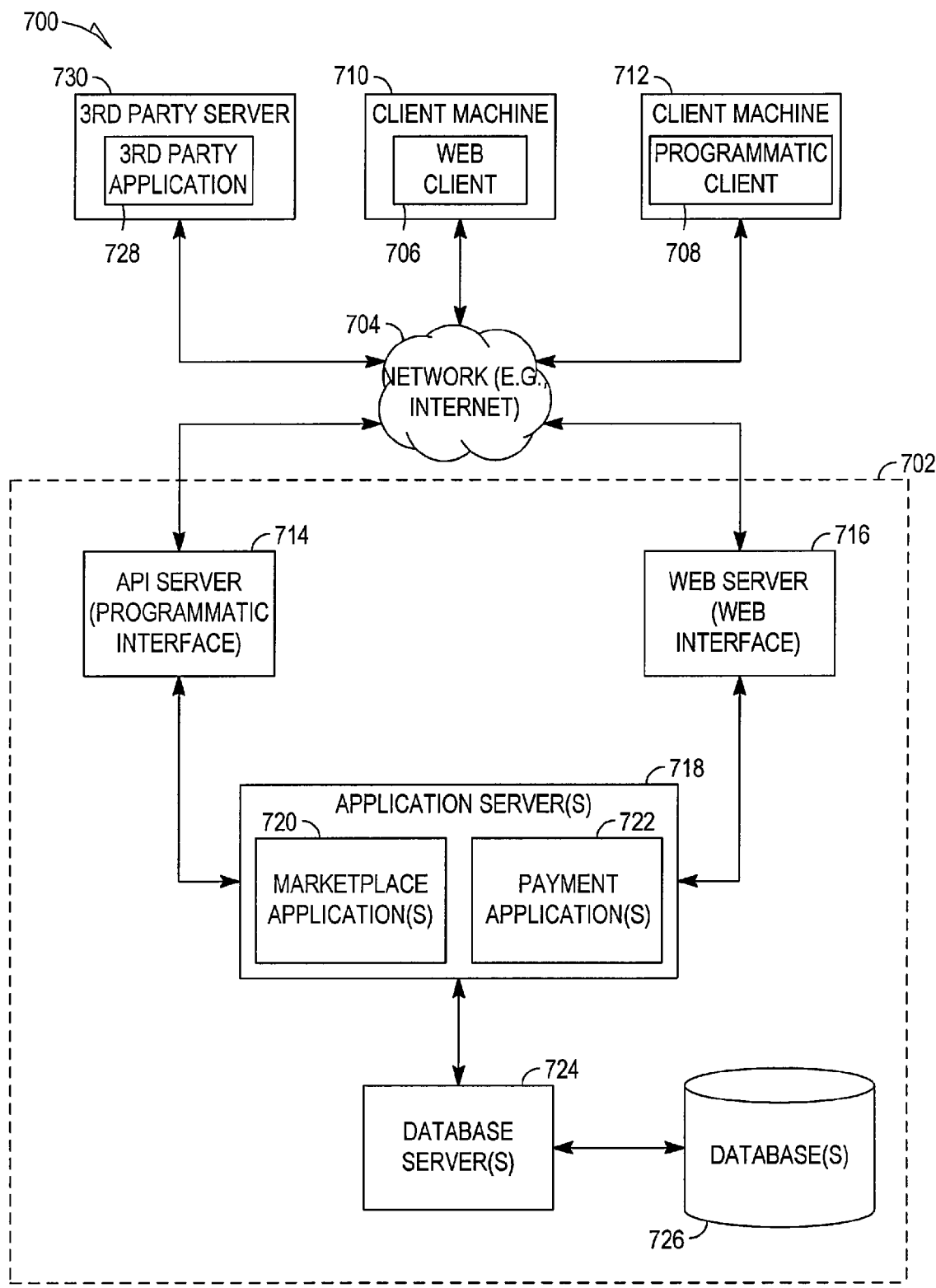
FIG. 7 is a network diagram depicting a client-server system, within which one example embodiment may be deployed.

FIG. 7 is a network diagram depicting a client-server system 700, within which one example embodiment may be deployed. A networked system 702, in the example forms of a network-based marketplace or publication system, provides server-side functionality, via a network 704 (e.g., the Internet or Wide Area Network (WAN)) to one or more clients. FIG. 7 illustrates, for example, a web client 706 (e.g., a browser, such as the Internet Explorer browser developed by Microsoft Corporation of Redmond, Washington State), and a programmatic client 708 executing on respective client machines 710 and 712.

An Application Program Interface (API) server 714 and a web server 716 are coupled to, and provide programmatic and web interfaces respectively to, one or more application servers 718. The application servers 718 host one or more marketplace applications 720 and payment applications 722. The application servers 718 are, in turn, shown to be coupled to one or more databases servers 724 that facilitate access to one or more databases 726.

The marketplace applications 720 may provide a number of marketplace functions and services to users that access the networked system 702, including the functionality for dynamically creating an advertisement relevant to one or more tokens. The payment applications 722 may likewise provide a number of payment services and functions to users. The payment applications 722 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 720. While the marketplace and payment applications 720 and 722 are shown in FIG. 7 to both form part of the networked system 702, it will be appreciated that, in alternative embodiments, the payment applications 722 may form part of a payment service that is separate and distinct from the networked system 702.

Further, while the system 700 shown in FIG. 7 employs a client-server architecture, the present invention is of course not limited to such an architecture, and could equally well find application in a distributed, or peer-to-peer, architecture system, for example. The various marketplace and payment applications 720 and 722 could also be implemented as standalone software programs, which do not necessarily have networking capabilities.

The web client 706 accesses the various marketplace and payment applications 720 and 722 via the web interface supported by the web server 716. Similarly, the programmatic client 708 accesses the various services and functions provided by the marketplace and payment applications 720 and 722 via the programmatic interface provided by the API server 714. The programmatic client 708 may, for example, be a seller application (e.g., the TurboLister application developed by eBay Inc., of San Jose, Calif.) to enable sellers to author and manage listings on the networked system 702 in an off-line manner, and to perform batch-mode communications between the programmatic client 708 and the networked system 702.

FIG. 7 also illustrates a third party application 728, executing on a third party server machine 730, as having programmatic access to the networked system 702 via the programmatic interface provided by the API server 714. For example, the third party application 728 may, utilizing information retrieved from the networked system 702, support one or more features or functions on a website hosted by the third party. The third party website may, for example, provide one or more promotional, marketplace or payment functions that are supported by the relevant applications of the networked system 702.

Marketplace Applications

Figure 8:
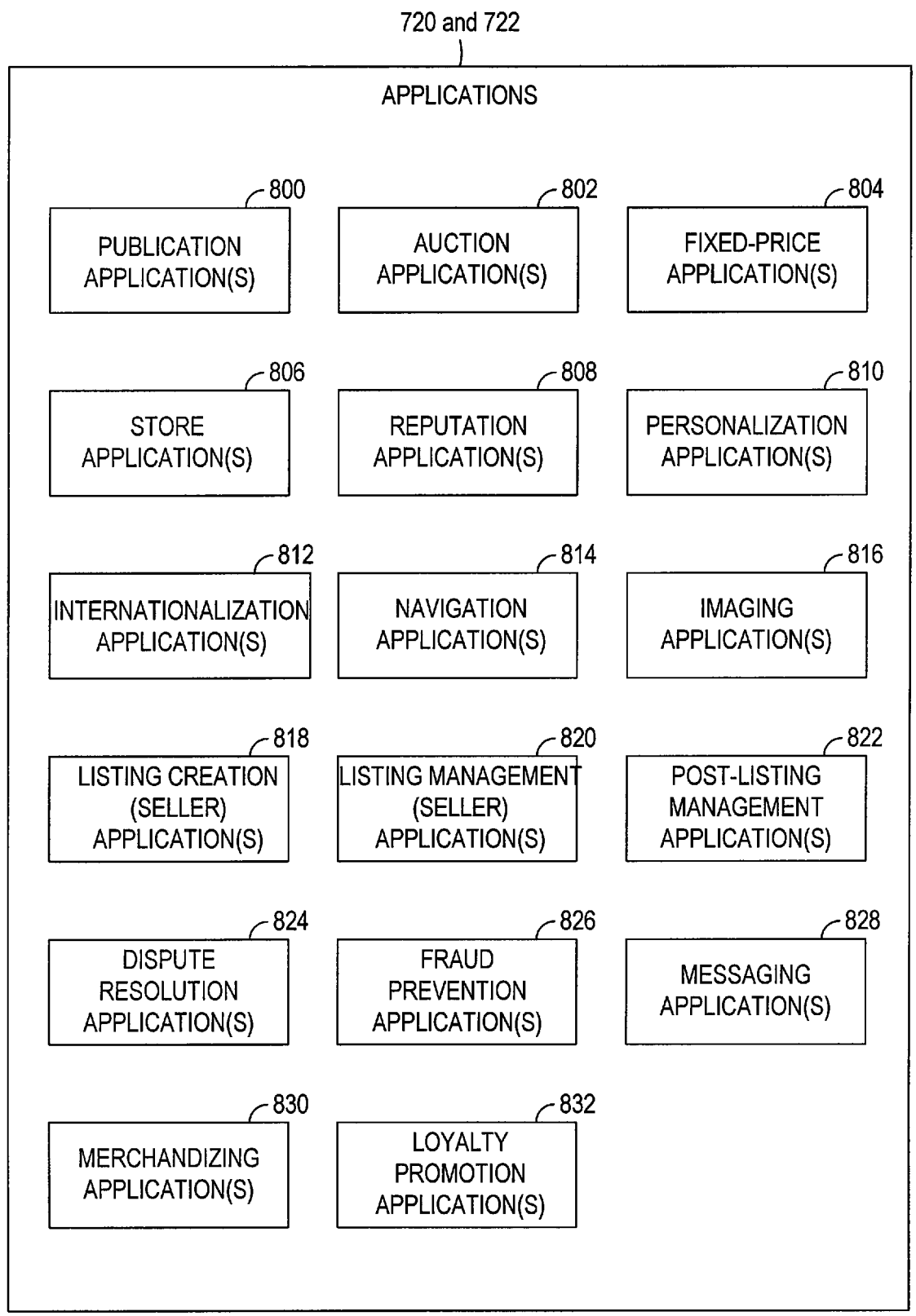
FIG. 8 is a block diagram illustrating multiple applications and that, in one example embodiment, are provided as part of the networked system.

FIG. 8 is a block diagram illustrating multiple applications 720 and 722 that, in one example embodiment, are provided as part of the networked system 702. The applications 720 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 726 via the database servers 728.

The networked system 702 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 720 are shown to include at least one publication application 800 and one or more auction applications 802 which support auction-format listing and price setting mechanisms (e.g., English, Dutch, Vickrey, Chinese, Double, Reverse auctions etc.). The various auction applications 802 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 804 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 806 allow a seller to group listings within a "virtual" store, which may be branded and otherwise personalized by and for the seller. Such a virtual store may also offer promotions, incentives and features that are specific and personalized to a relevant seller.

Reputation applications 808 allow users that transact, utilizing the networked system 702, to establish, build and maintain reputations, which may be made available and published to potential trading partners. Consider that where, for example, the networked system 702 supports person-to-person trading, users may otherwise have no history or other reference information whereby the trustworthiness and credibility of potential trading partners may be assessed. The reputation applications 808 allow a user, for example through feedback provided by other transaction partners, to establish a reputation within the networked system 702 over time. Other potential trading partners may then reference such a reputation for the purposes of assessing credibility and trustworthiness.

Personalization applications 810 allow users of the networked system 702 to personalize various aspects of their interactions with the networked system 702. For example a user may, utilizing an appropriate personalization application 810, create a personalized reference page at which information regarding transactions to which the user is (or has been) a party may be viewed. Further, a personalization application 810 may enable a user to personalize listings and other aspects of their interactions with the networked system 702 and other parties.

The networked system 702 may support a number of marketplaces that are customized, for example, for specific geographic regions. A version of the networked system 702 may be customized for the United Kingdom, whereas another version of the networked system 702 may be customized for the United States. Each of these versions may operate as an independent marketplace, or may be customized (or internationalized) presentations of a common underlying marketplace. The networked system 702 may accordingly include a number of internationalization applications 812 that customize information (and/or the presentation of information) by the networked system 702 according to predetermined criteria (e.g., geographic, demographic or marketplace criteria). For example, the internationalization applications 812 may be used to support the customization of information for a number of regional websites that are operated by the networked system 702 and that are accessible via respective web servers 716.

Navigation of the networked system 702 may be facilitated by one or more navigation applications 814. For example, a search application (as an example of a navigation application) may enable key word searches of listings published via the networked system 702. A browse application may allow users to browse various category, catalogue, or inventory data structures according to which listings may be classified within the networked system 702. Various other navigation applications may be provided to supplement the search and browsing applications.

In order to make listings, available via the networked system 702, as visually informing and attractive as possible, the marketplace applications 720 may include one or more imaging applications 816 utilizing which users' may upload images for inclusion within listings. An imaging application 816 also operates to incorporate images within viewed listings. The imaging applications 816 may also support one or more promotional features, such as image galleries that are presented to potential buyers. For example, sellers may pay an additional fee to have an image included within a gallery of images for promoted items.

Listing creation applications 818 allow sellers conveniently to author listings pertaining to goods or services that they wish to transact via the networked system 702, and listing management applications 820 allow sellers to manage such listings. Specifically, where a particular seller has authored and/or published a large number of listings, the management of such listings may present a challenge. The listing management applications 820 provide a number of features (e.g., auto-relisting, inventory level monitors, etc.) to assist the seller in managing such listings. One or more post-listing management applications 822 also assist sellers with a number of activities that typically occur post-listing. For example, upon completion of an auction facilitated by one or more auction applications 802, a seller may wish to leave feedback regarding a particular buyer. To this end, a post-listing management application 822 may provide an interface to one or more reputation applications 808, so as to allow the seller conveniently to provide feedback regarding multiple buyers to the reputation applications 808.

Dispute resolution applications 824 provide mechanisms whereby disputes arising between transacting parties may be resolved. For example, the dispute resolution applications 824 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 826 implement fraud detection and prevention mechanisms to reduce the occurrence of fraud within the networked system 702.

Messaging applications 828 are responsible for the generation and delivery of messages to users of the networked system 702, such messages for example advising users regarding the status of listings at the networked system 702 (e.g., providing "outbid" notices to bidders during an auction process or to provide promotional and merchandising information to users). Respective messaging applications 828 may utilize any one have a number of message delivery networks and platforms to deliver messages to users. For example, messaging applications 828 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 830 support various merchandising functions that are made available to sellers to enable sellers to increase sales via the networked system 702. The merchandising applications 80 also operate the various merchandising features that may be invoked by sellers, and may monitor and track the success of merchandising strategies employed by sellers.

The networked system 702 itself, or one or more parties that transact via the networked system 702, may operate loyalty programs that are supported by one or more loyalty/promotions applications 832. For example, a buyer may earn loyalty or promotions points for each transaction established and/or concluded with a particular seller, and be offered a reward for which accumulated loyalty points can be redeemed.

Data Structures

Figure 9:
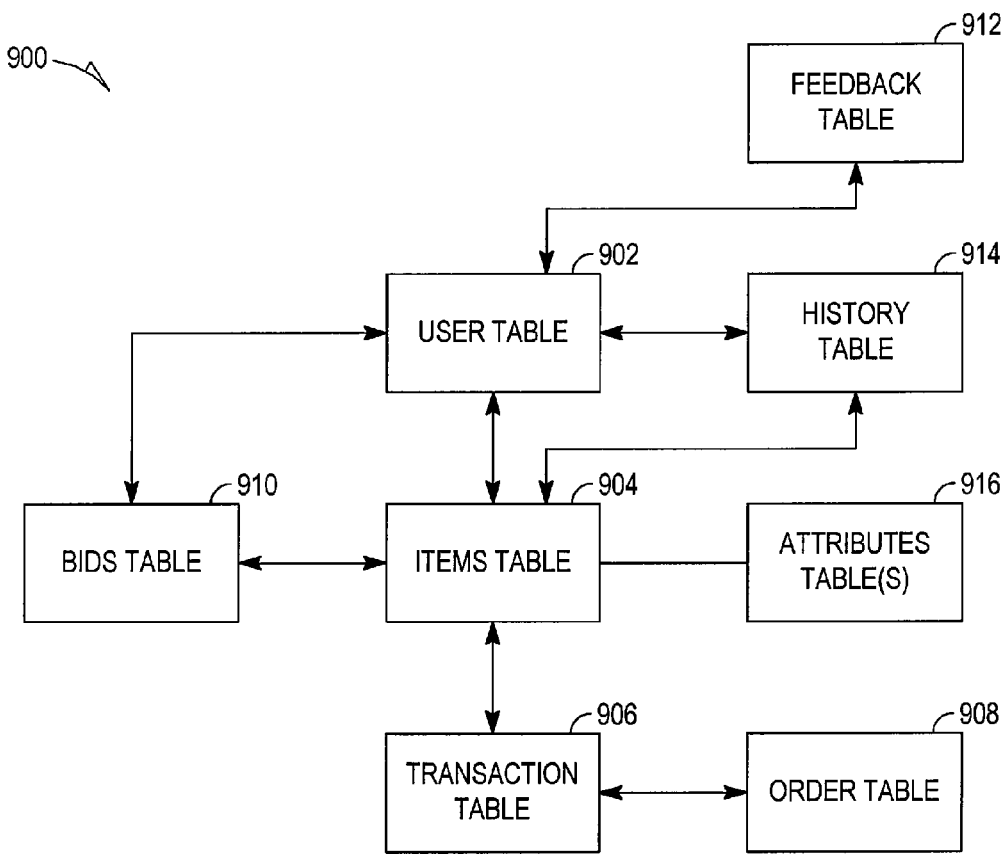
FIG. 9 is a high-level entity-relationship diagram, illustrating various tables that may be maintained within the databases, and that are utilized by and support the applications.

FIG. 9 is a high-level entity-relationship diagram, illustrating various tables 900 that may be maintained within the databases 726, and that are utilized by and support the applications 720 and 722. A user table 902 contains a record for each registered user of the networked system 702, and may include identifier, address and financial instrument information pertaining to each such registered user. A user may operate as a seller, a buyer, or both, within the networked system 702. In one example embodiment, a buyer may be a user that has accumulated value (e.g., commercial or proprietary currency), and is accordingly able to exchange the accumulated value for items that are offered for sale by the networked system 702.

The tables 900 also include an items table 904 in which are maintained item records for goods and services that are available to be, or have been, transacted via the networked system 702. Each item record within the items table 904 may furthermore be linked to one or more user records within the user table 902, so as to associate a seller and one or more actual or potential buyers with each item record.

A transaction table 906 contains a record for each transaction (e.g., a purchase or sale transaction) pertaining to items for which records exist within the items table 904.

An order table 908 is populated with order records, each order record being associated with an order. Each order, in turn, may be with respect to one or more transactions for which records exist within the transaction table 906.

Bid records within a bids table 910 each relate to a bid received at the networked system 702 in connection with an auction-format listing supported by an auction application 802. A feedback table 912 is utilized by one or more reputation applications 808, in one example embodiment, to construct and maintain reputation information concerning users. A history table 914 maintains a history of transactions to which a user has been a party. One or more attributes tables 916 record attribute information pertaining to items for which records exist within the items table 904. Considering only a single example of such an attribute, the attributes tables 916 may indicate a currency attribute associated with a particular item, the currency attribute identifying the currency of a price for the relevant item as specified in by a seller.

Figure 10:
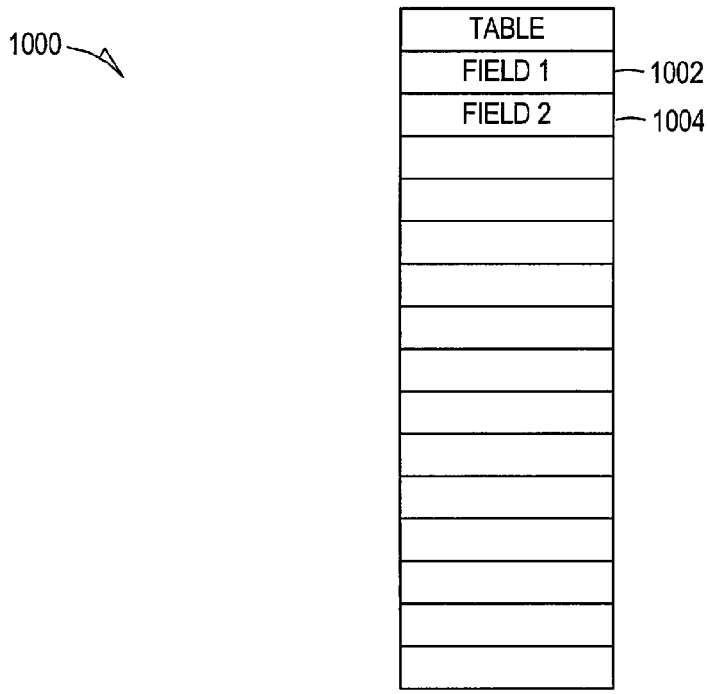
FIG. 10 provides further details regarding attribute tables that are shown in FIG. 9 to be maintained within the databases.

FIG. 10 provides further details regarding pertinent tables that are shown in FIG. 9 to be maintained within the databases 726. A table 1000 for a token catalog indicates tokens and types of tokens. In field 1002, a token is indicated. In field 1004, a type is indicated for the token indicated in field 1002.

Figure 11:
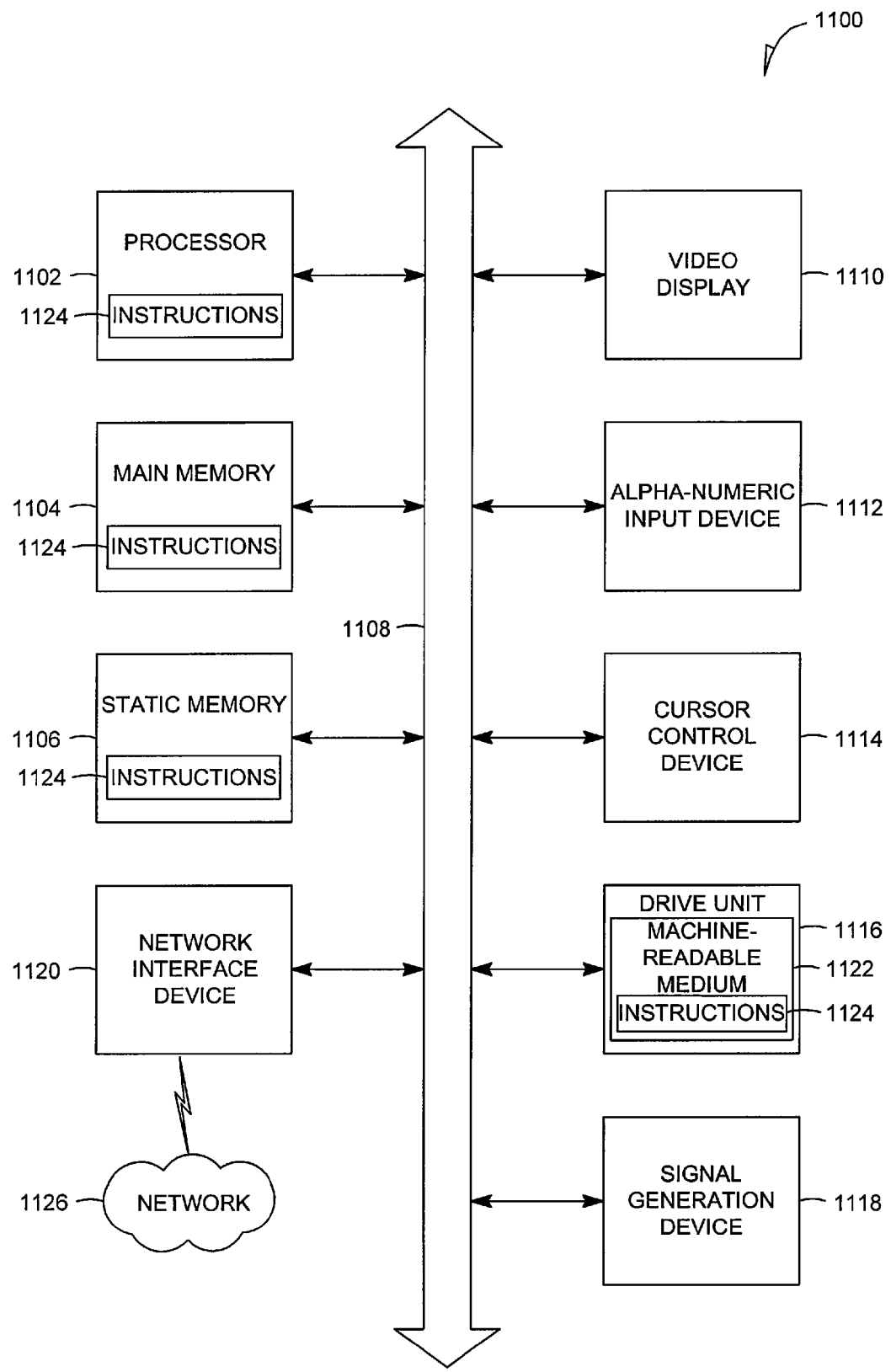
FIG. 11 shows a diagrammatic representation of machine in the example form of a computer system within which a set of instructions, for causing the machine to perform any one or more of the methodologies discussed herein, may be executed.

FIG. 11 shows a diagrammatic representation of machine in the example form of a computer system 1100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions (e.g., software 1124) embodying any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to dynamically generated an advertisement have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A system comprising:
   a commerce database that hosts product data and merchant data;
   a token database; and
   a dynamic advertisement server that analyzes information about a web session between a user machine and a web server, that accesses the token database to determine a token based on the analyzed web session information, that generates a query with the token, that queries the commerce database with the query, and that automatically assembles data received in response to the query into a dynamically created advertisement relevant to the token, wherein
   the web server is separate to the system.

2. The system of claim 1 further comprising the dynamic advertisement server receiving the web session information from the user machine and transmitting the dynamically created advertisement to the user machine.

3. The system of claim 1 further comprising a storage that hosts a plurality of advertisement templates, wherein the dynamic advertisement server accesses the storage for at least one of the plurality of advertisement templates when assembling retrieved data into a dynamically created advertisement.

4. A method comprising:
   receiving, at a commerce network, information about a web session between a user machine and a web server, the web server being separate to the commerce network and the web session involving a web page served by the web server to the user machine;
   distilling a token from the information about the web session;
   generating a query with the token;
   retrieving data from a commerce database based on the query;
   assembling the retrieved data into a dynamically created advertisement; and
   delivering the dynamically created advertisement for rendering with the web page.

5. The method of claim 4, further comprising indicating a link in the dynamically created advertisement directly to a check out site for direct purchase of a product identified in the dynamically created advertisement.

6. The method of claim 4, wherein the information about the web session is selected from a set consisting essentially of information about one or more users, information about a host of the web page, search terms entered by a user, one or more tips from a publisher of the web page, and content of the web page.

7. The method of claim 4, wherein the distilling comprises:
   parsing the information into a set of one or more candidate tokens; and
   searching a catalog of tokens based on the set of one or more candidate tokens.

8. The method of claim 4, wherein the distilling comprises analyzing tags of the web page.

9. The method of claim 4, wherein the token represents one of a set consisting essentially of a merchant, a product, and a product category.

10. The method of claim 4, wherein the data is selected from a set consisting essentially of product listings, merchant information, and references to content sites.

11. The method of claim 4 further comprising injecting the dynamically created advertisement into the web page for rendering.

12. The method of claim 4 further comprising encountering a trigger to gather and submit the web session information while rendering the web page.

13. A program product encoded in one or more machine-readable media, the program product comprising:
   a first set of instructions executable by a dynamic advertisement server to distill a token from information about a web page transaction between a user machine and a web server, the web server being separate to the dynamic advertisement server; and
   a second set of instructions executable to query a commerce database generated from a token distilled by the first set of instructions and executable to automatically assemble data received in response to the query into a dynamically created advertisement relevant to the token.

14. The program product of claim 13, wherein the first set of instructions being executable to distill the token comprises the first set of instructions being executable to analyze tags of the web page requested in the web page transaction.

15. The program product of claim 13, wherein the first set of instructions executable to distill the token comprises the first set of instructions being executable to determine a user from the information, to retrieve information about the user, and to determine the token from the information about the user.

16. The program product of claim 13, wherein the first set of instructions executable to distill the token comprises the first set of instructions being executable to determine a set of one or more candidate tokens from the information and to search a catalog of tokens based on the set of one or more candidate tokens.

17. The program product of claim 13, wherein the second set of instructions is further executable to determine a set of one or more parameters based on a type of the token and to apply the set of one or more parameters to the query to filter data.

18. The program product of claim 13, wherein the second set of instructions being executable to assemble the data into the dynamically created advertisement comprises the second set of instructions being executable to,
   generate a web document,
   define a style sheet based on the token, and
   embed retrieved data into the generated web document.

19. The program product of claim 13 further comprising a third set of instructions executable to cause transmission of an advertisement dynamically generated by the second set of instructions.

20. An apparatus comprising:
a set of one or more processors;
a network interface;
means for receiving web session information about a web session between a user machine and a web server, the web server being separate to the apparatus;
means for generating a query based on a token relating to received web session information;
means for querying a commerce database with the query; and
means for dynamically creating an advertisement with an assembly of purchasing data received from the commerce database in response to the querying.

21. The apparatus of claim 20, wherein the purchasing data is selected from a set consisting essentially of merchant review data, product data, static advertisements, and merchant offering data.

22. The apparatus of claim 20, wherein the web session information is selected from a set consisting essentially of product category, user, product, and merchant.

\* \* \* \* \*